United States Patent
Fisher et al.

(10) Patent No.: US 12,065,860 B2
(45) Date of Patent: Aug. 20, 2024

(54) LATCH LOCKING COVER FOR ENCLOSURES

(71) Applicant: Hubbell Incorporated, Shelton, CT (US)

(72) Inventors: Michael Edward Fisher, Knoxville, TN (US); Wiley Richard Tipton, Friendsville, TN (US); Robert Wilton Fox, Greenback, TN (US)

(73) Assignee: HUBBELL INCORPORATED, Shelton, CT (US)

( * ) Notice: Subject to any disclaimer, the term of this patent is extended or adjusted under 35 U.S.C. 154(b) by 283 days.

(21) Appl. No.: 16/349,661

(22) PCT Filed: Nov. 2, 2017

(86) PCT No.: PCT/US2017/059749
§ 371 (c)(1),
(2) Date: May 14, 2019

(87) PCT Pub. No.: WO2018/089251
PCT Pub. Date: May 17, 2018

(65) Prior Publication Data
US 2019/0345740 A1    Nov. 14, 2019

Related U.S. Application Data

(60) Provisional application No. 62/421,640, filed on Nov. 14, 2016.

(51) Int. Cl.
*E05B 65/52*    (2006.01)
*E05B 63/00*    (2006.01)
*E05C 1/10*     (2006.01)

(52) U.S. Cl.
CPC ............... *E05B 65/52* (2013.01); *E05C 1/10* (2013.01); *E05B 2063/0039* (2013.01)

(58) Field of Classification Search
CPC .......... Y10T 292/097; Y10T 292/0969; Y10T 292/1014; E05B 65/52; E05B 65/06;
(Continued)

(56) References Cited

U.S. PATENT DOCUMENTS 462,658 A * 11/1891 Baier ................... E05B 63/248
    292/254
1,016,081 A *  1/1912 McNulty ................. E06B 9/02
    49/465

(Continued)

FOREIGN PATENT DOCUMENTS

CA    2998570 A1 *  3/2017 ............. E02D 29/14
DE      351927 C  *  4/1922 ........... E05B 35/008
(Continued)

OTHER PUBLICATIONS

International Search Report and Written Opinion dated Apr. 5, 2018 in corresponding PCT/US17/59749.
(Continued)

*Primary Examiner* — Kristina R Fulton
*Assistant Examiner* — Steven A Tullia
(74) *Attorney, Agent, or Firm* — Wissing Miller LLP

(57) ABSTRACT

Enclosure covers for use with direct burial enclosures are provided. The enclosure covers includes a latch assembly that permits the enclosure cover to automatically lock to an enclosure box when installed.

26 Claims, 12 Drawing Sheets

(58) Field of Classification Search
CPC .. E05B 2063/0039; E05B 35/008; E05C 1/10; E05C 1/004; E05C 1/12; Y10S 292/11; E02D 29/1427; E02D 29/14; E02D 29/1445; H02G 9/025; H02G 9/10
USPC .................................. 404/25; 52/19, 20, 21
See application file for complete search history.

(56) References Cited

U.S. PATENT DOCUMENTS

| | | | | |
|---|---|---|---|---|
| 1,287,290 | A * | 12/1918 | Golden | E01F 13/085 |
| | | | | 49/35 |
| 1,473,986 | A * | 11/1923 | Brown | E02D 29/1427 |
| | | | | 70/169 |
| 1,693,190 | A * | 11/1928 | Benedetti | E02D 29/1427 |
| | | | | 49/465 |
| 2,608,085 | A * | 8/1952 | Castle | E02D 29/1427 |
| | | | | 70/169 |
| 2,801,768 | A | 8/1957 | Immel | |
| 2,881,940 | A | 4/1959 | Hamilton | |
| 2,950,141 | A | 8/1960 | Koff | |
| 3,029,964 | A | 4/1962 | Hudson | |
| 3,405,834 | A | 10/1968 | Butler | |
| 3,606,064 | A | 9/1971 | Butler | |
| 3,648,577 | A | 3/1972 | Lanzendorfer et al. | |
| 3,751,949 | A * | 8/1973 | Castle | E05C 1/14 |
| | | | | 70/144 |
| 3,843,013 | A | 10/1974 | Brooks, Jr. | |
| 3,858,755 | A * | 1/1975 | Tellen | E02D 29/1427 |
| | | | | 220/284 |
| 3,952,908 | A | 4/1976 | Carson | |
| 4,142,329 | A * | 3/1979 | Williams | E02D 29/1427 |
| | | | | 49/465 |
| 4,145,151 | A * | 3/1979 | Helms | E02D 29/14 |
| | | | | 210/164 |
| 4,220,363 | A | 9/1980 | Foster, Jr. et al. | |
| 4,227,731 | A * | 10/1980 | Castle | B65G 7/12 |
| | | | | 294/17 |
| 4,257,193 | A | 3/1981 | Williams | |
| 4,790,579 | A * | 12/1988 | Maxwell | E05C 1/10 |
| | | | | 292/175 |
| 4,902,165 | A * | 2/1990 | Embree | B65D 90/10 |
| | | | | 404/72 |
| 4,964,755 | A * | 10/1990 | Lewis | E02D 29/1409 |
| | | | | 292/336.3 |
| 5,194,696 | A | 3/1993 | Read | |
| 5,324,135 | A * | 6/1994 | Smith | E02D 29/1427 |
| | | | | 210/164 |
| 5,574,254 | A | 11/1996 | Mori et al. | |
| 5,944,210 | A | 8/1999 | Yetter | |
| 6,199,414 | B1 * | 3/2001 | Chang | E02D 29/1427 |
| | | | | 292/11 |
| 6,732,555 | B1 * | 5/2004 | Nielsen | E05B 17/2023 |
| | | | | 411/910 |
| 6,739,796 | B1 * | 5/2004 | Del Nero | E02D 29/1427 |
| | | | | 404/25 |
| 7,501,573 | B2 * | 3/2009 | Balfour, Jr. | H02G 9/025 |
| | | | | 52/33 |
| 7,547,051 | B2 | 6/2009 | Burke et al. | |
| 7,607,553 | B2 | 10/2009 | Weber | |
| 7,669,901 | B2 * | 3/2010 | Paterson | F02M 35/0203 |
| | | | | 292/108 |
| 7,798,742 | B2 * | 9/2010 | Nolle | E02D 29/14 |
| | | | | 294/23 |
| 7,891,904 | B2 * | 2/2011 | Stadler | E02D 29/1436 |
| | | | | 404/25 |
| 8,220,298 | B2 * | 7/2012 | Burke | E05B 65/006 |
| | | | | 70/169 |
| 9,876,340 | B2 | 1/2018 | Unger et al. | |
| 2003/0001395 | A1 * | 1/2003 | Barthelet | H04M 1/0262 |
| | | | | 292/175 |
| 2004/0055231 | A1 | 3/2004 | Dang | |
| 2006/0021396 | A1 * | 2/2006 | Javaux | E02D 29/1427 |
| | | | | 70/168 |
| 2009/0020304 | A1 * | 1/2009 | Balfour, Jr. | H02G 9/10 |
| | | | | 174/37 |
| 2009/0211779 | A1 | 8/2009 | Drane | |
| 2011/0203334 | A1 * | 8/2011 | Rix | E05B 61/00 |
| | | | | 70/158 |
| 2013/0248534 | A1 | 9/2013 | Dang | |
| 2016/0069039 | A1 | 3/2016 | Johnson et al. | |
| 2016/0160532 | A1 * | 6/2016 | Patino | E02D 29/1427 |
| | | | | 70/167 |
| 2016/0297607 | A1 * | 10/2016 | Burke | B32B 27/12 |

FOREIGN PATENT DOCUMENTS

| | | | | |
|---|---|---|---|---|
| DE | 3604164 A1 * | 8/1986 | | E02D 29/1427 |
| DE | 4337147 A1 * | 6/1994 | | E02D 29/14 |
| EP | 0527560 | 2/1993 | | |
| EP | 1621679 A1 * | 2/2006 | | E02D 29/1427 |
| EP | 1892336 A2 * | 2/2008 | | E02D 29/1427 |
| EP | 1911888 A2 | 4/2008 | | E02D 29/1427 |
| EP | 2079881 B1 * | 3/2011 | | E02D 29/1409 |
| EP | 2543800 A1 * | 1/2013 | | E02D 29/1445 |
| FR | 2933993 A1 * | 1/2010 | | E02D 29/12 |
| FR | 3016652 A1 * | 7/2015 | | E05B 65/006 |
| GB | 000168499 | 9/1921 | | |
| GB | 321859 A * | 11/1929 | | E05C 1/10 |
| KR | 200205762 Y1 * | 12/2000 | | |
| WO | WO-2015136175 A1 * | 9/2015 | | E02D 29/1427 |

OTHER PUBLICATIONS

International Preliminary Report of Patentability dated May 23, 2019 in corresponding PCT/US17/59749.

\* cited by examiner

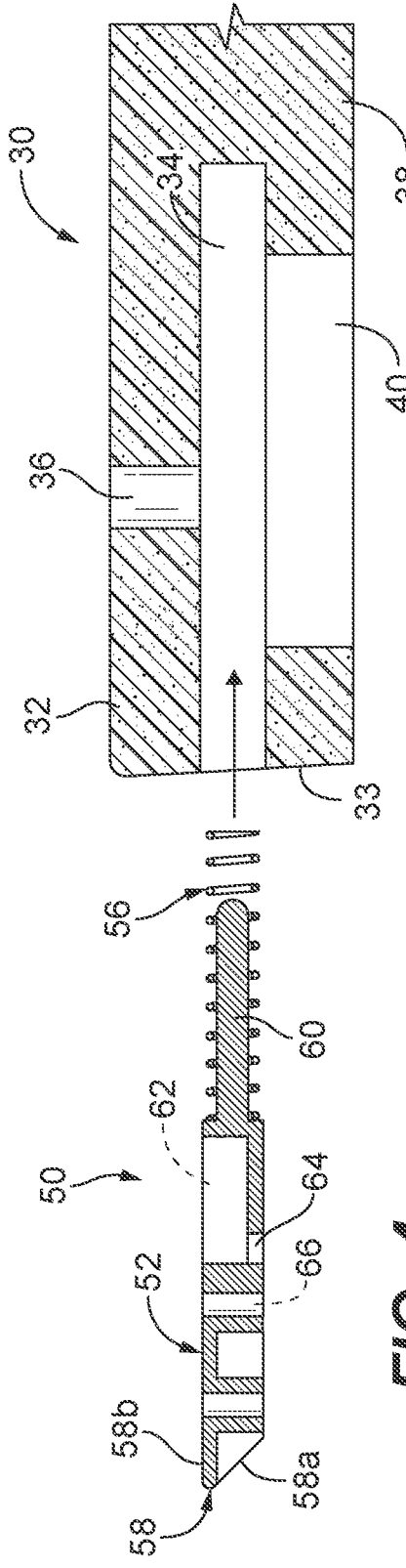
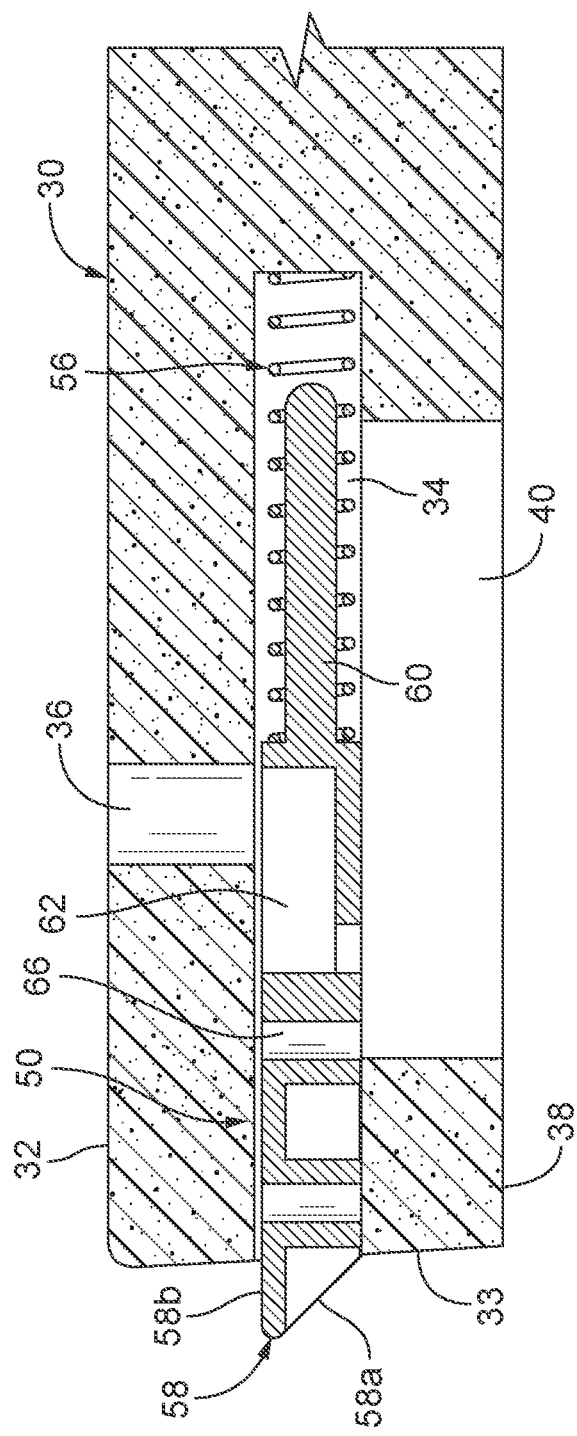
FIG. 4
FIG. 5

LATCH LOCKING COVER FOR ENCLOSURES

CROSS-REFERENCE TO RELATED APPLICATIONS

This application is a 371 of PCT/US2017/059749 filed on Nov. 2, 2017, published on May 17, 2018 under publication number WO 2018/089251 A1, which claims priority benefits from U.S. Provisional Application No. 62/421,640 filed Nov. 14, 2016 the entire contents of both are incorporated herein in their entirety by reference.

BACKGROUND

Field

The present disclosure relates generally to underground enclosures and to automatically locking covers for underground enclosures.

Description of the Related Art

Utility companies such as water, communication, electric and/or gas utilities often use subterranean utility enclosures as junction boxes for their water, communication, electric or gas networks to provide services. For example, underground electric utility cabling may run through subterranean enclosure boxes having covers at grade to permit workman access.

The enclosure covers are often bolted to the enclosure box to prevent easy access to the interior of the enclosure box. In certain circumstances, the enclosure cover may be secured to the enclosure box using a threaded bolt that extends from the enclosure cover into a threaded aperture in the enclosure box. Generally, securing the enclosure cover to the enclosure box by tightening a bolt is time consuming and if a workman fails to bolt the cover to the box then the enclosure is susceptible to tampering.

SUMMARY

The present disclosure provides embodiments of enclosure covers for use with direct burial enclosures. In one exemplary embodiment, an enclosure cover assembly comprises a cover dimensioned to rest on the cover receiving ledge of an enclosure box and at least one latch assembly. The cover has an upper surface, a lower surface, a side wall between the upper and lower surfaces, at least one assembly opening extending from the side wall toward an interior of the cover, and at least one tool opening extending from the upper surface to the at least one assembly opening. The at least one latch assembly is positioned within the at least one assembly opening and is movable between a locking position and an opening position. The at least one latch assembly is normally biased toward the locking position. The at least one latch assembly comprises a body, a spring and a latch stop. The body has a tongue at one end, a spring stem at another end and a cup between the tongue and the spring stem. The spring is positioned on the spring stem and is provided to normally bias the latch assembly toward the locking position. The latch stop extends from the body and is provided to limit the movement of the at least one latch assembly within the at least one assembly opening.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 is a cross-sectional view of the latch assembly and a portion of the enclosure cover taken along line 4-4 of FIG. 2, illustrating the latch assembly positioned for insertion into an assembly opening in the enclosure cover;

FIG. 5 is the latch assembly and enclosure cover of FIG. 4 illustrating the latch assembly inserted into the assembly opening;

DETAILED DESCRIPTION

The present disclosure provides embodiments of direct burial enclosures, enclosure covers for use with direct burial enclosures, and to enclosure kits. The exemplary embodiments of the enclosures generally comprise an enclosure box and an enclosure cover that automatically locks when installed on a ledge of the enclosure box. The exemplary embodiments of the enclosure kits generally comprise an enclosure box, an enclosure cover that automatically locks when installed on a ledge of the enclosure box and a cover removal tool that can be used to unlock the enclosure cover and to remove the enclosure cover from the enclosure box.

Figure 1:
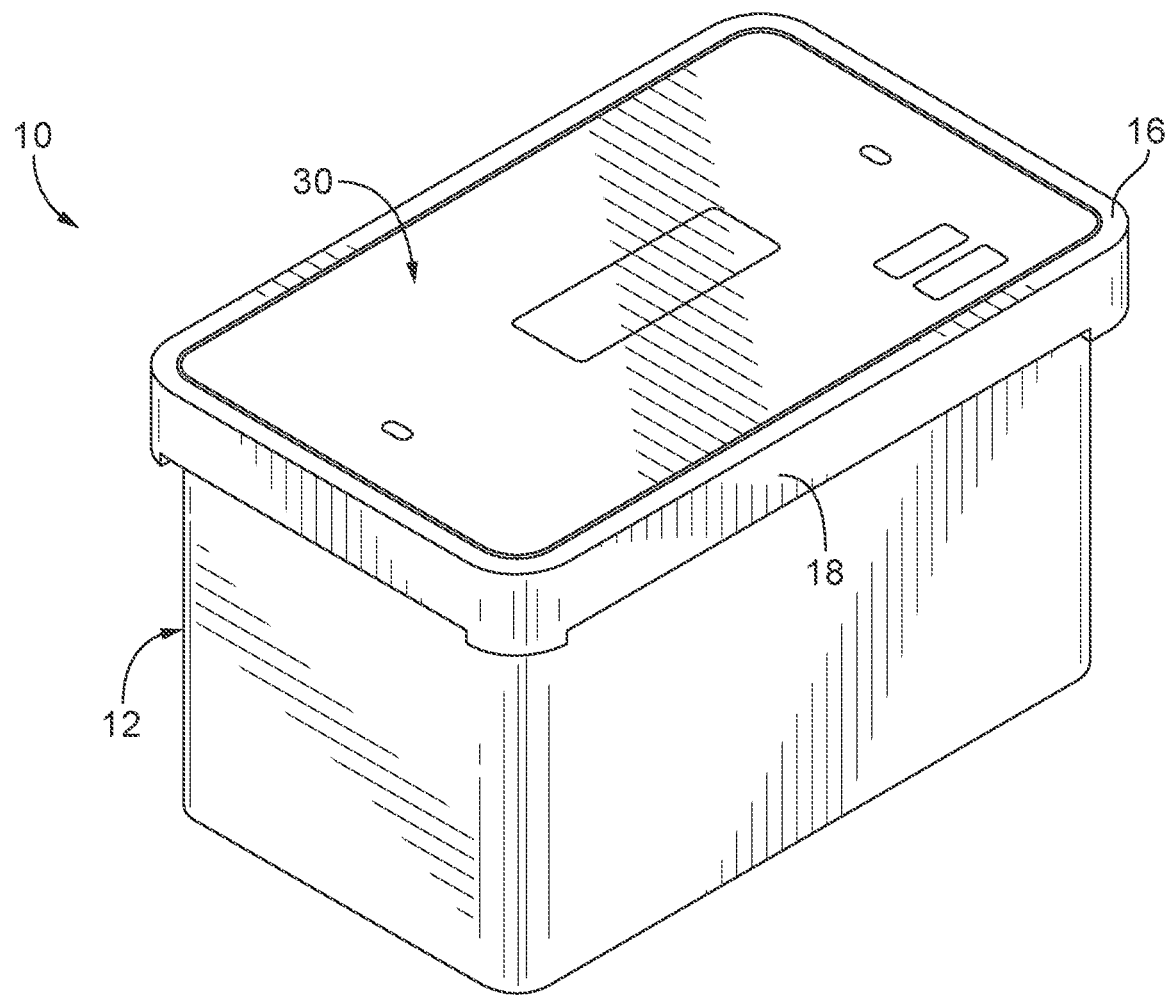
FIG. 1 is top perspective view of an exemplary embodiment of a utility enclosure having an enclosure box and an enclosure cover with a latch assembly according to the present disclosure.
Figure 2:
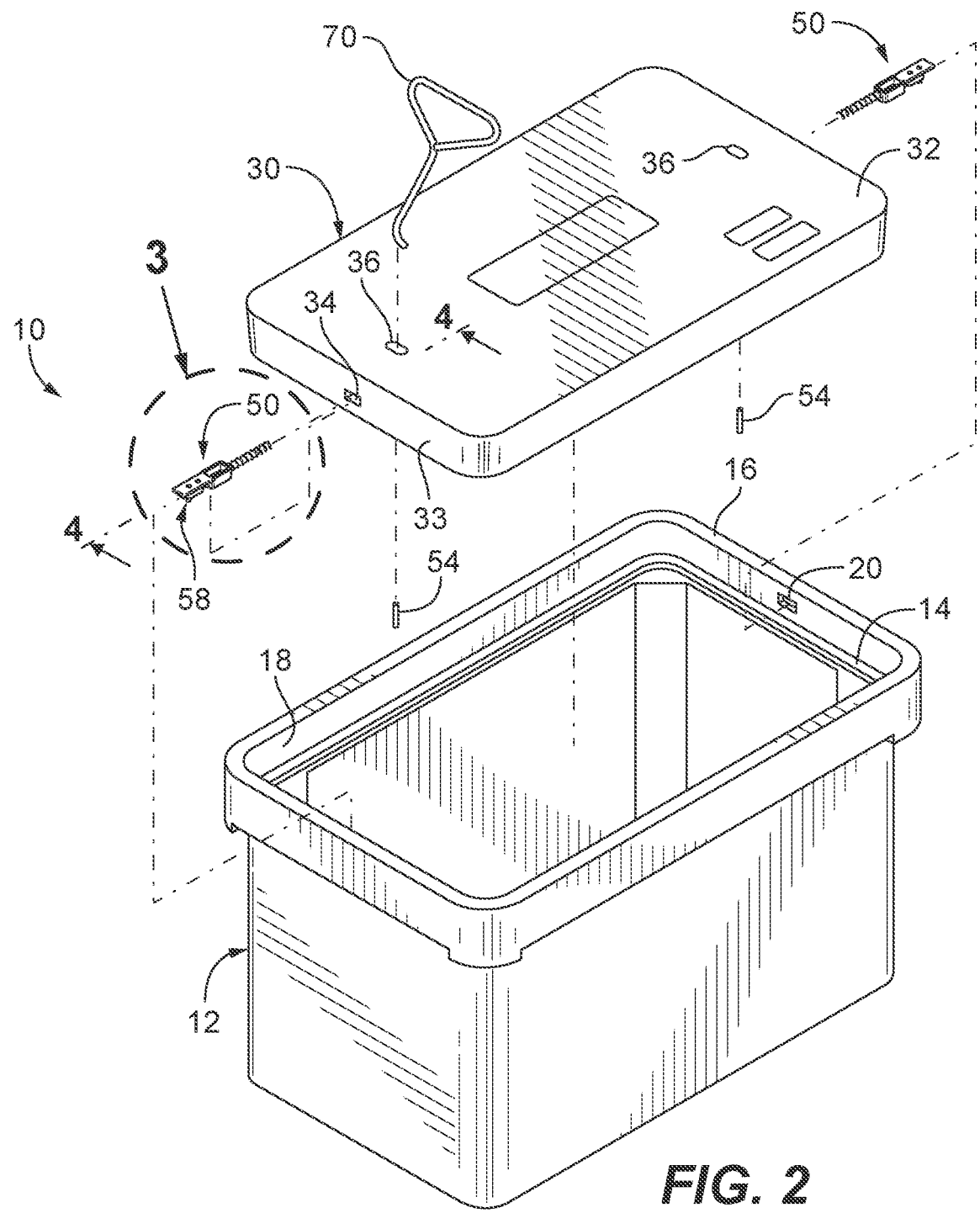
FIG. 2 is a top perspective view of the utility enclosure of FIG. 1 with the enclosure cover separated from the enclosure box illustrating a latch assembly according to the present disclosure.

Referring now to the figures, an enclosure according to an exemplary embodiment of the present disclosure is shown in FIGS. 1 and 2. The enclosure 10 includes an enclosure box 12 and an enclosure cover 30. The enclosure box 12 is similar to a conventional underground enclosure in that it may be in many different shapes and sizes. For example, the enclosure box 12 shown is a rectangular shaped box having a ledge 14 around an inner perimeter of a top portion of the enclosure box 12. The ledge 14 is configured and dimensioned to support the enclosure cover 30 so that a top surface 32 of the enclosure cover 30 is preferably even with a top edge 16 of the enclosure box 12. The enclosure box 12 may be made of a rigid plastic material, a concrete material, a metallic material, a composite material, a fiberglass material, a bulk molding compound or combinations thereof. An example of a plastic material includes injection molded thermoplastic. An example of a concrete material includes polymer concrete. Examples of metallic materials include steel, galvanized steel, stainless steel, aluminum and cast aluminum. Examples of composite materials include carbon fiber composite materials. As shown in FIG. 2, an inner perimeter wall 18 of the enclosure box 12 between the ledge 14 and the top edge 16 has one or more notches 20 configured to mate with the latch assembly described below. In the embodiment shown in FIG. 2 there are two notches in the perimeter wall 18—one at each long end of the rectangular enclosure box 12.

Figure 11:
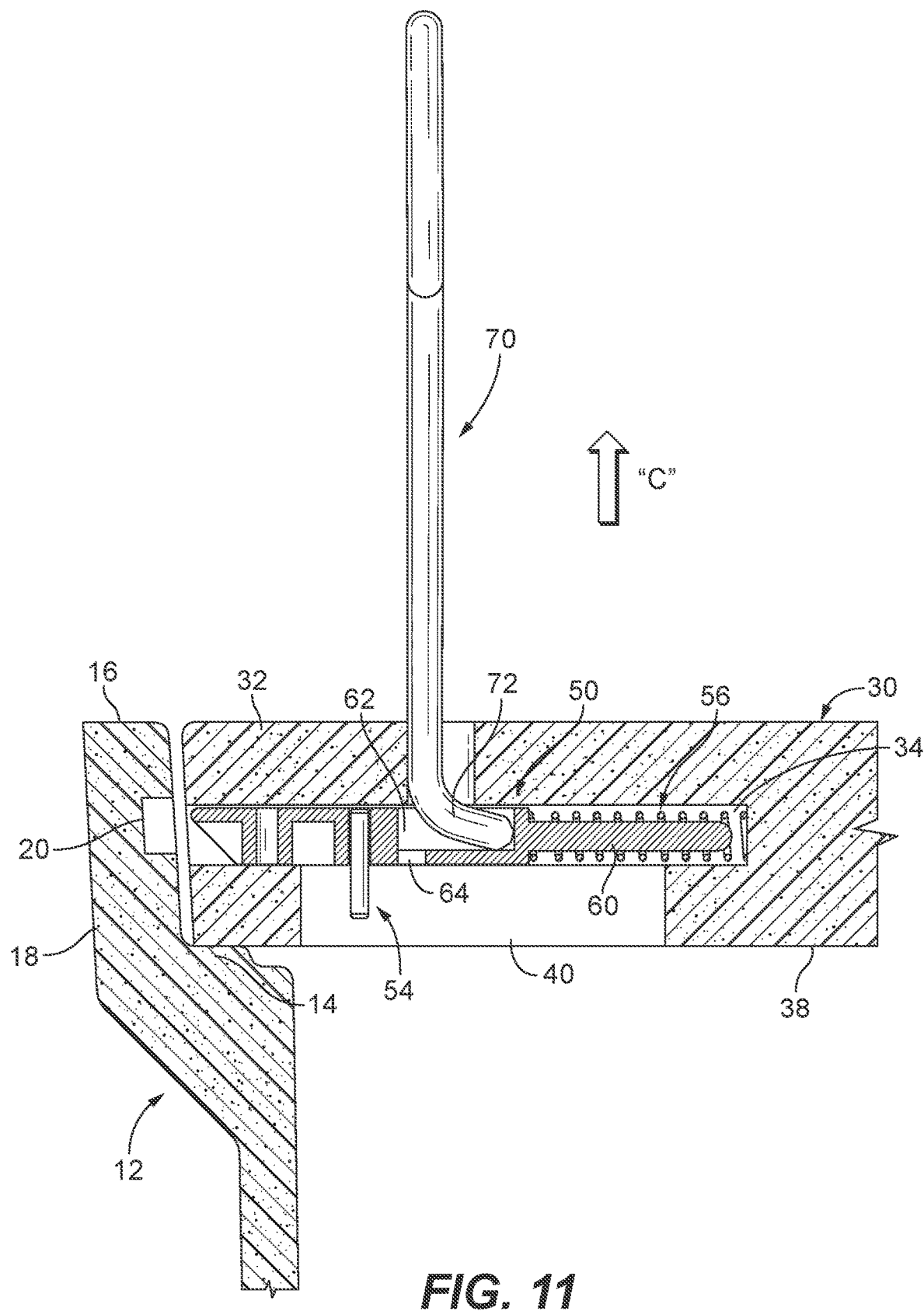
FIG. 11 is a side cross-sectional view of the enclosure box, enclosure cover and the latch assembly of FIG. 10, illustrating the cover removal tool being pivoted causing the latch assembly to move from a locking position to an opening position.
Figure 14:
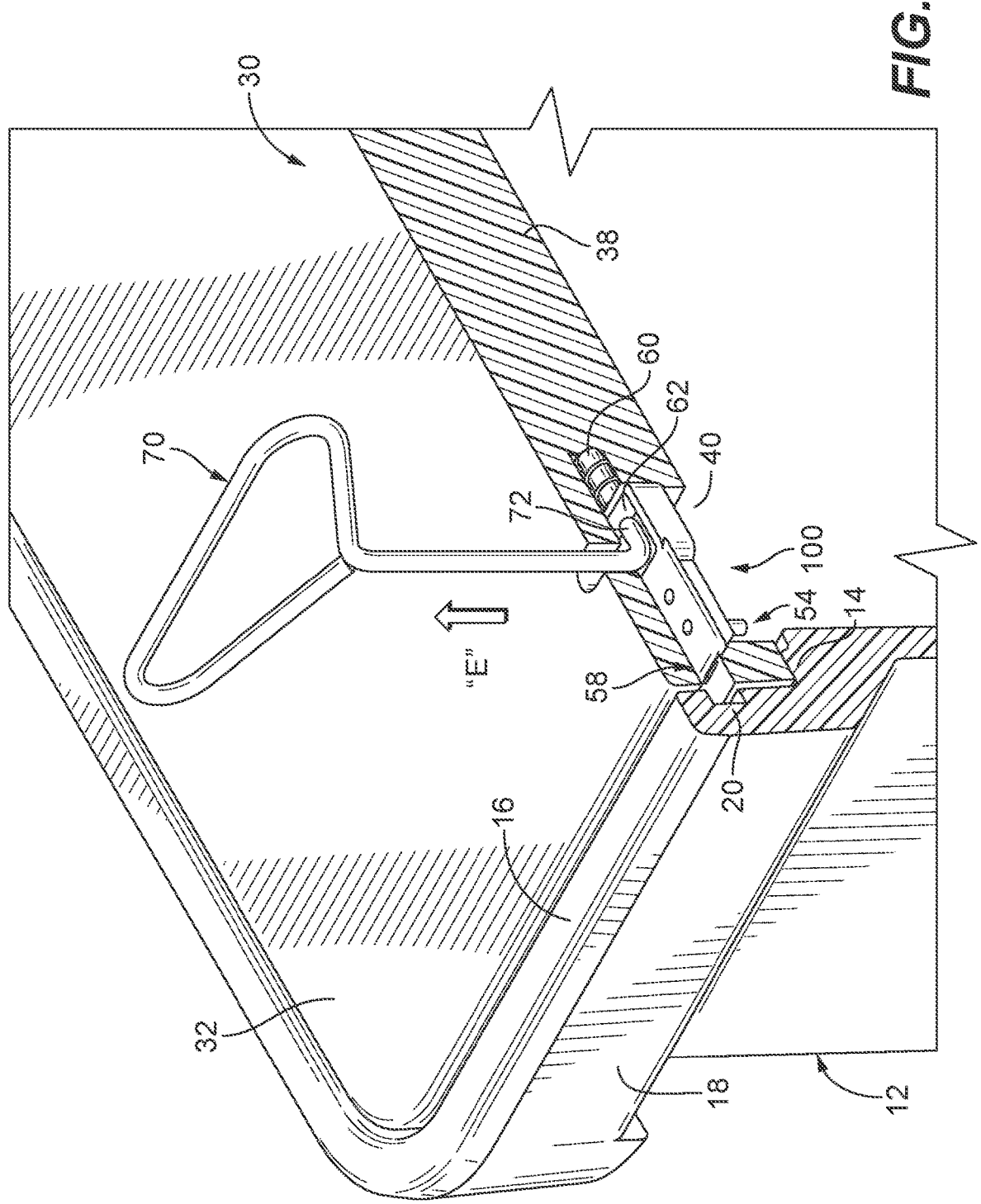
FIG. 14 is the enclosure box and enclosure cover of FIG. 13, illustrating the cover removal tool being rotated to cause the latch assembly to move from the locking position to the opening position.

Referring to FIGS. 1, 2 and 4, the enclosure cover 30 has a frame configured and dimensioned to fit within the enclosure box 12 and rest on cover receiving ledge 14. Thus, the enclosure cover 30 frame may be in many different shapes and sizes sufficient to fit within the particular enclosure box 12. For example, the enclosure box 12 is a rectangular shaped box having a ledge 14 around an inner perimeter wall 18, and the enclosure cover 30 is a rectangular shaped cover that resets on the ledge 14. The enclosure cover 30 includes one or more assembly openings 34 through which the latch assembly 50 of the present disclosure is inserted. The one or more assembly openings 34 are shaped to conform to the shape of the latch assembly 50 so that the latch assembly can be inserted into the assembly opening 34 and slide within the assembly opening 34 between a locking position, seen in FIG. 7, and an opening position, seen in FIG. 6, as will be described below. The enclosure cover 30 also has a tool opening 36 extending between the top surface 32 of the enclosure cover 30 and the assembly opening 34. The tool opening 36 is provided to permit a cover removal tool 70 as shown in FIGS. 11 and 14 to be inserted through the enclosure cover 30 into engagement with the latch assembly 50 which will be described below. Between a bottom surface 38 of the enclosure cover 30 and the assembly opening 34 is a slot 40. The slot 40 permits a latch stop 54 of the latch assembly 50 to move when the latch assembly moves, as shown in FIG. 3.

The enclosure cover 30 may be made of a rigid plastic material, a concrete material, a metallic material, a composite material, a fiberglass material, a bulk molding compound or combinations thereof. An example of a plastic material includes injection molded thermoplastic. An example of a concrete material includes polymer concrete. Examples of metallic materials include steel, galvanized steel, stainless steel, aluminum and cast aluminum. Examples of composite materials include carbon fiber composite materials.

Figure 3:
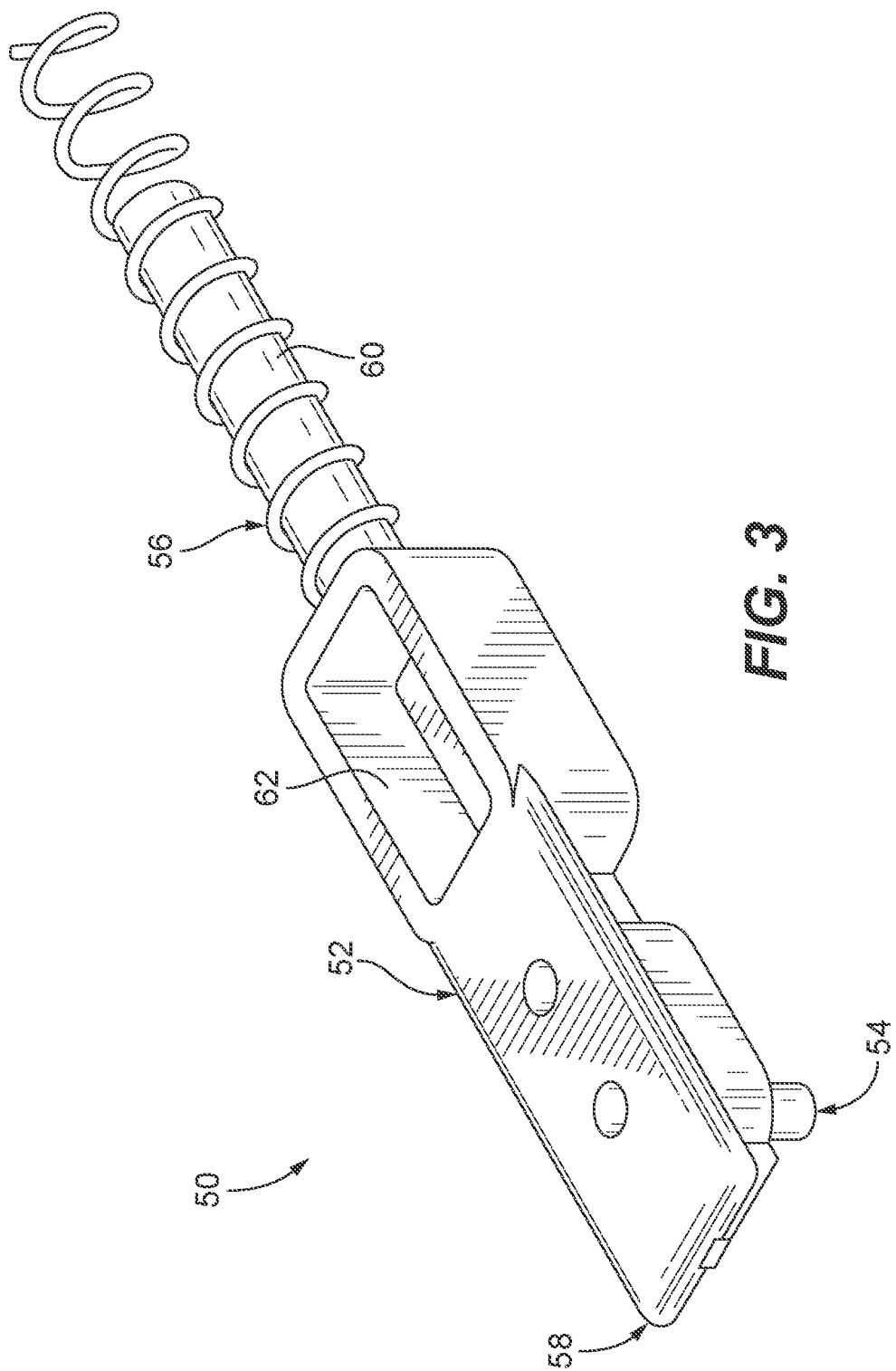
FIG. 3 is top perspective view of an exemplary embodiment of a latch assembly for the utility enclosure of FIG. 1.

Turning to FIGS. 3 and 4, an exemplary embodiment of the latch assembly 50 of the present disclosure, which may also be referred to herein as the "assembly" is shown. The latch assembly 50 includes a body 52, a latch stop 54 and a spring 56. At one end of the body 52 is a tongue 58 and extending from an opposite end of the body 52 is a spring stem 60 used to support the spring 56. Between the tongue 58 and spring stem 60 is a cup 62 configured to receive an end of the cover removal tool 70. The cup 62 includes a drip opening 64 used to drain water and debris from the cup 62. The latch stop 54 is provided to limit the distance the tongue 58 can extend from the assembly opening 34 and to prevent the latch assembly 50 from being removed from the latch opening 34 after installation. The latch stop 54 extends from the body 52 preferably perpendicular to the body 52 as shown. However, one skilled in the art would readily appreciate that the latch stop 54 can be at any orientation relative to the body 52 so long as the latch stop 54 limits the distance the tongue 58 can extend from the latch opening 34 and prevents the latch assembly 50 from being removed from the latch opening 34 after installation. In the embodiment shown, the latch stop 54 is positioned in close proximity to the tongue 58. However, one skilled in the art would readily appreciate that the latch stop 54 can be positioned at any location along the body 52 so long as the latch stop 54 limits the distance the tongue 58 can extend from the assembly opening 34 and prevents the latch assembly 50 from being removed from the latch opening 34 after installation. The latch stop 54 is inserted into the latch stop opening 66 in the body 52 and secured to the body by friction fit. In another embodiment, the latch stop 54 can be secured to the body 52 using welds, mechanical fasteners and/or adhesives. The tongue 58 includes a camming surface 58a and a flat upper surface 58b. The camming surface 58a is used to move the latch assembly 50 when automatically locking the enclosure cover 30 to the enclosure box 12, and the flat upper surface 58b engages the enclosure box 12 to prevent removal of the enclosure cover 30 from the enclosure box 12.

The body 52, latch stop 54 and spring 56 may be made of a metallic material, a plastic material, a composite material, a fiberglass material, and a bulk molding compound or combinations thereof. Examples of metallic materials include steel, stainless steel, galvanized steel, aluminum or cast aluminum. An example of a plastic material includes injection molded thermoplastic. Examples of composite materials include carbon fiber composite materials.

Figure 6:
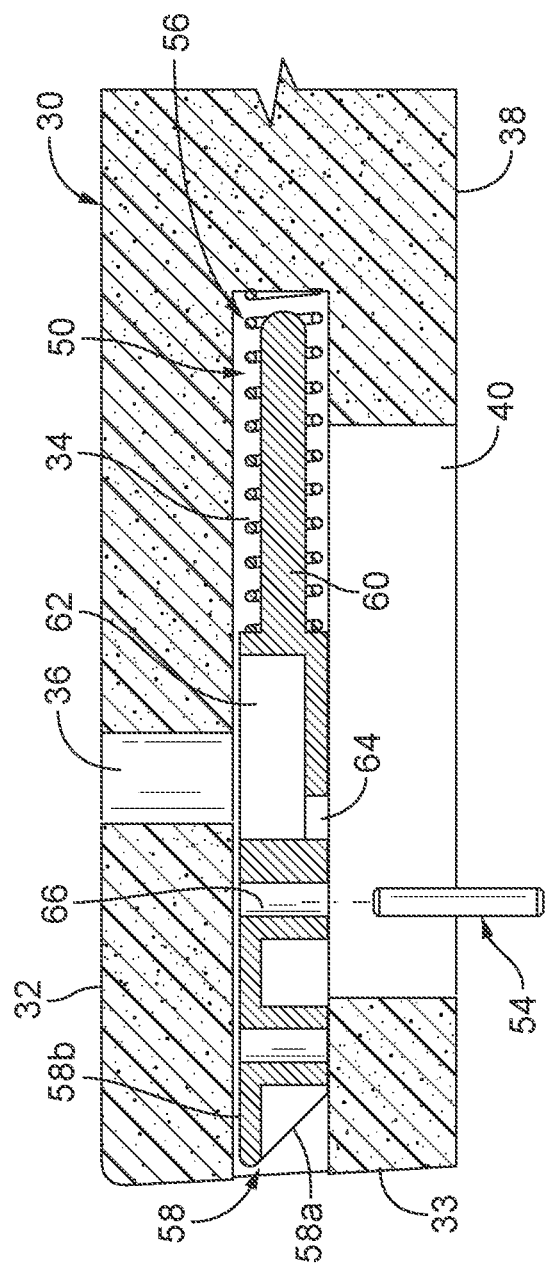
FIG. 6 is a cross-sectional view of the latch assembly inserted into the assembly opening of FIG. 5 with a latch stop positioned within a slot in the enclosure cover that prevents the latch assembly from being removed from the assembly opening.
Figure 7:
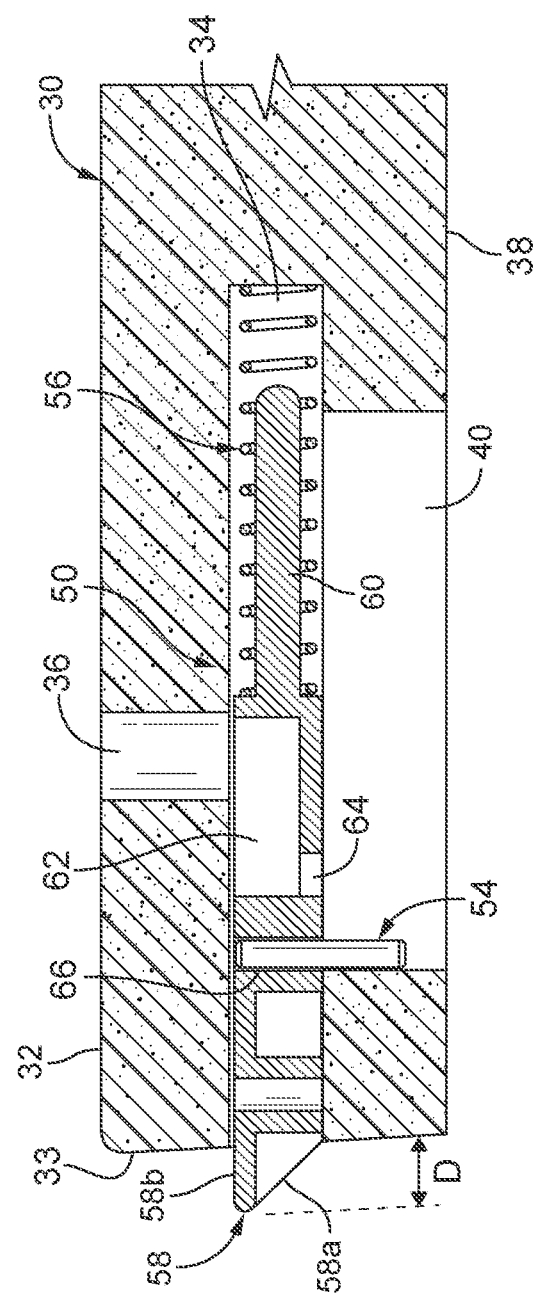
FIG. 7 is the latch assembly and enclosure cover of FIG. 6 with the latch stop engaging an end of the slot to prevent the latch assembly from being removed from the assembly opening.
Figure 8:
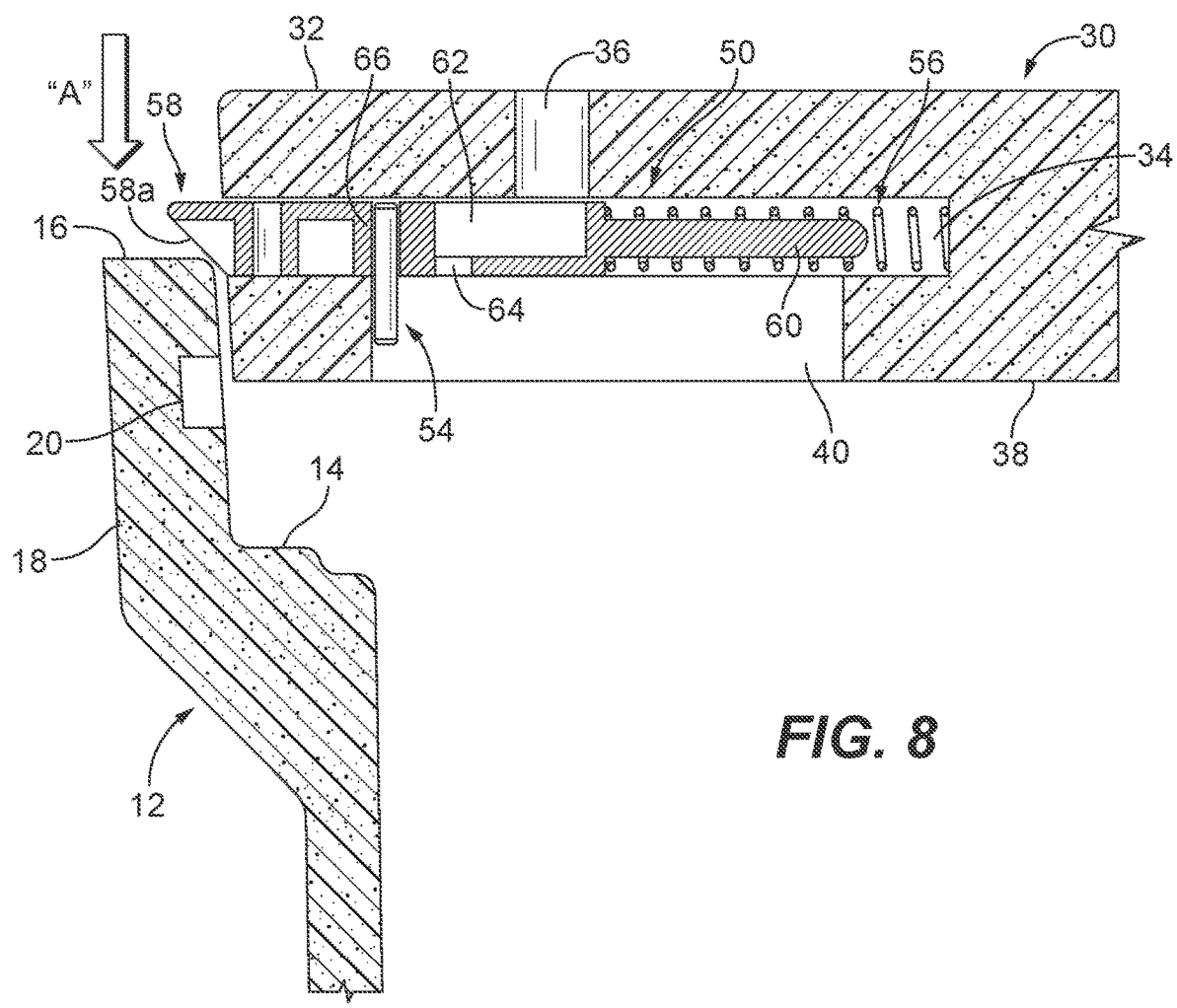
FIG. 8 is a side cross-sectional view of the latch assembly and enclosure cover of FIG. 7 with the enclosure cover positioned for installation in the enclosure box and illustrating a tongue of the latch assembly engaging a top edge of the enclosure box.
Figure 9:
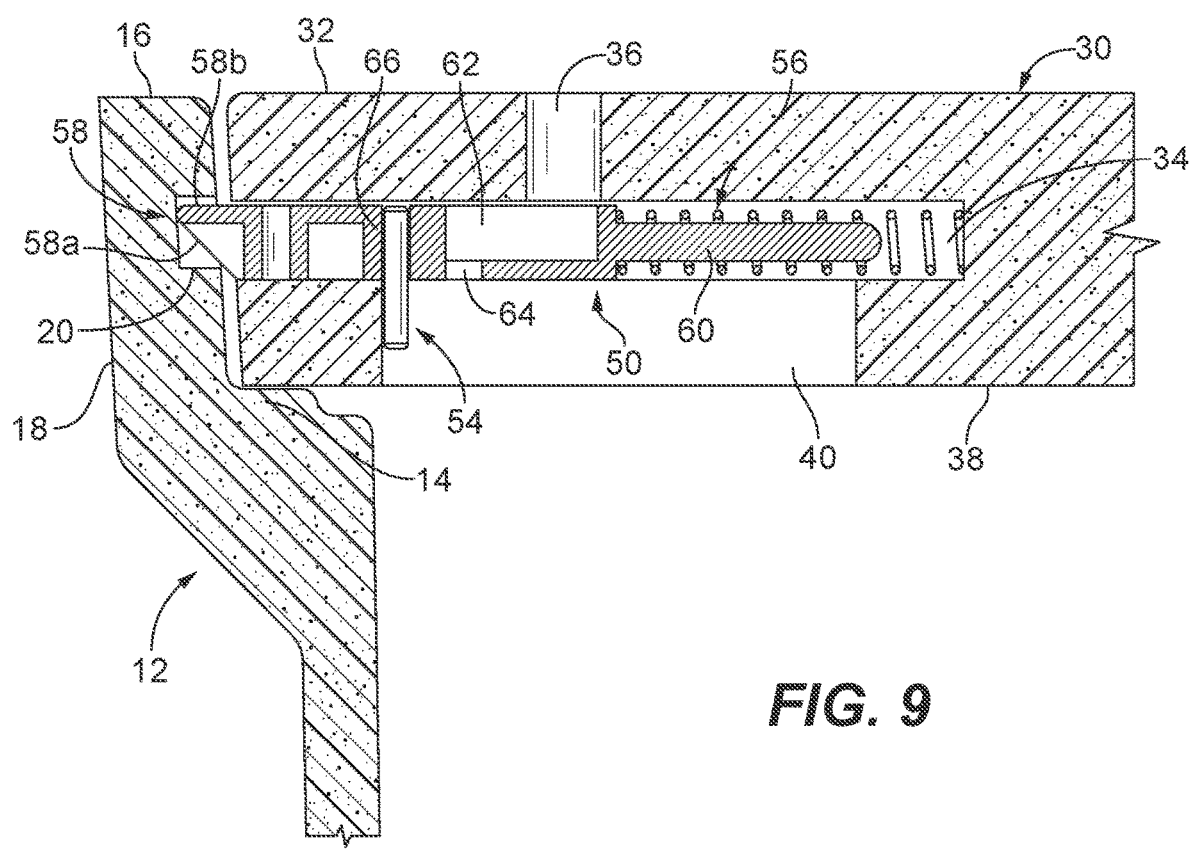
FIG. 9 is a side cross-sectional view of the latch assembly and enclosure cover of FIG. 7 with the enclosure cover installed in the enclosure box and illustrating the tongue of the latch assembly within a notch in a perimeter wall of the enclosure box.
Figure 10:
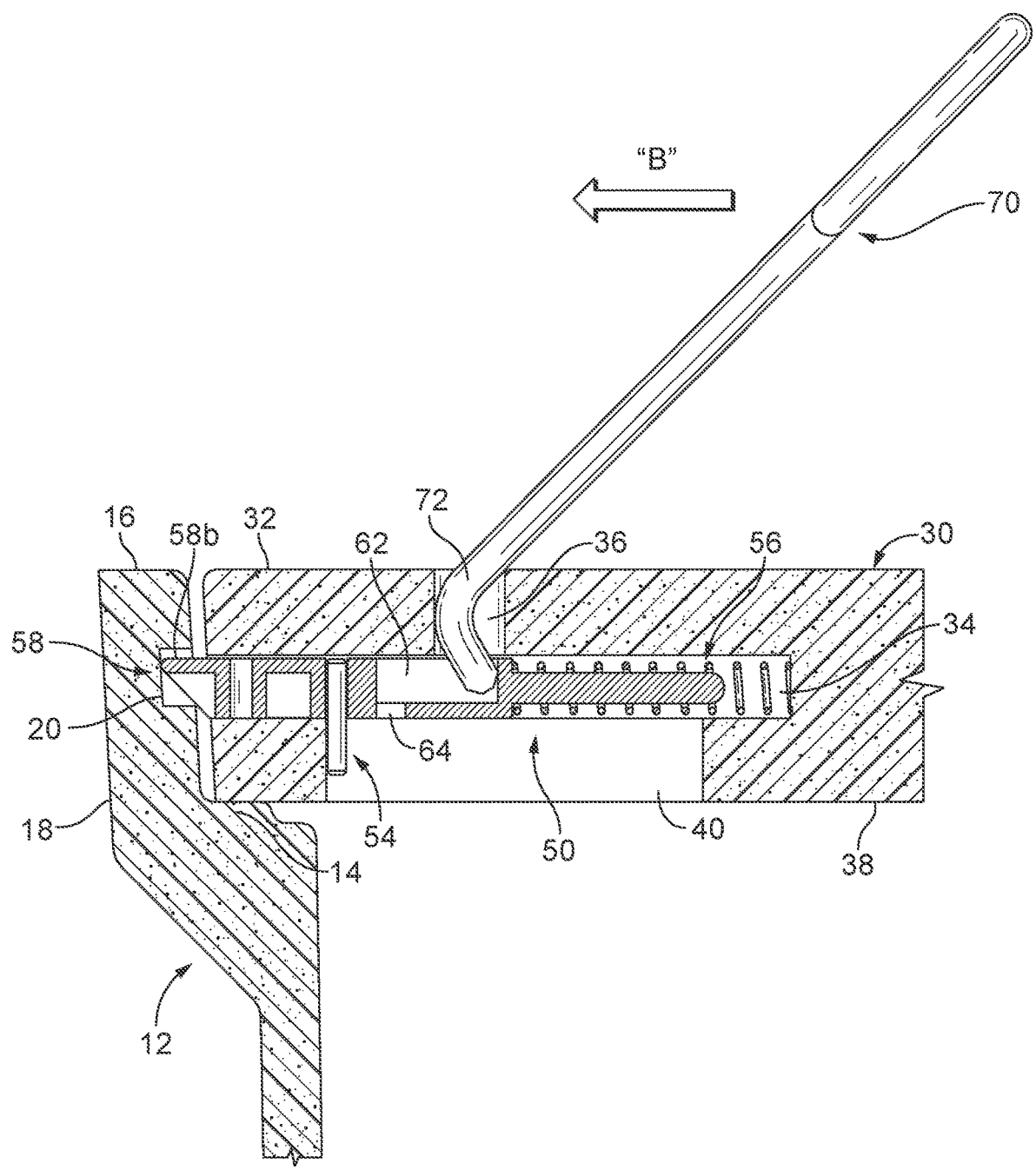
FIG. 10 is a side cross-sectional view of the enclosure box, enclosure cover and the latch assembly of FIG. 9, illustrating a cover removal tool being inserted through the enclosure cover and into a cup of the latch assembly.

Turning to FIGS. 4-7, installation of a latch assembly 50 into the enclosure cover 30 will be described. Initially the body 52 and spring 56 of the latch assembly 50 are inserted into the assembly opening 34 as shown in FIGS. 4 and 5. With the latch assembly 50 within the assembly opening 34 the tongue 58 is pushed inward compressing the spring 56 to ensure that latch stop opening 66 in body 52 is accessible via slot 40 in the enclosure cover 30. With the latch stop opening 66 accessible, the latch stop 54 is then inserted into the latch stop opening 66 as shown in FIGS. 6 and 7. In this configuration, the latch assembly 50 is movable within the assembly opening 34 between a locking position, shown in FIG. 7, where the tongue 58 extends beyond a side surface 33 of the enclosure cover 30, and an opening position, shown in FIG. 6, where the tongue 58 is recessed within the assembly opening 34. The spring 56 normally biases the latch assembly 50 to the locking position. The latch stop 54 limits the distance "D" (seen in FIG. 7) that the tongue 58 can extend beyond the side surface 33 of the enclosure cover 30 while allowing the latch stop to move within slot 40 in the enclosure cover. When installing the enclosure cover 30 into the enclosure box 12, as shown in FIGS. 8 and 9, the camming surface 58a of the tongue 58 engages the top edge 16 of the enclosure box 12 causing the latch assembly 50 to move inwardly compressing spring 56. As the enclosure cover moves in the direction of arrow "A" into the enclosure box 12, the inner perimeter wall 18 prevents the tongue 58 of the latch assembly 50 from returning to the locking position. When the tongue 58 encounters notch 20 in the perimeter wall 18 the spring 56 causes the latching assembly 50 to move to the locking position where the tongue 58 mates with the notch 20 and the camming surface 58a of the tongue 58 prevents the removal of the enclosure cover 30 from the enclosure box 12. Thus, automatically locking the enclosure cover 30 to the enclosure box 12. To unlock the latch assembly 50 and remove the enclosure cover 30 a cover removal tool 70 is used. More specifically and referring to FIGS. 10 and 11, a distal end 72 of the cover removal tool 70, which is angled, is inserted into the tool opening 36 in the enclosure cover 30 so that the distal end 72 of the tool 70 is at least partially within the cup 62 of the latch assembly 50 so that the free end of the distal end 72 engages a side wall of the cup 62. The tool 70 is then pivoted upwardly as shown by arrow "B" so that the free end of the distal end 72 causes the latch assembly 50 to move inwardly toward the opening position compressing spring 56. The tool 72 is then lifted in the direction of arrow "C" so that the angled distal end 72 of the tool 70 engages an upper wall of the assembly opening 34, thus lifting the enclosure cover 30 out of the enclosure box 12.

Figure 12:
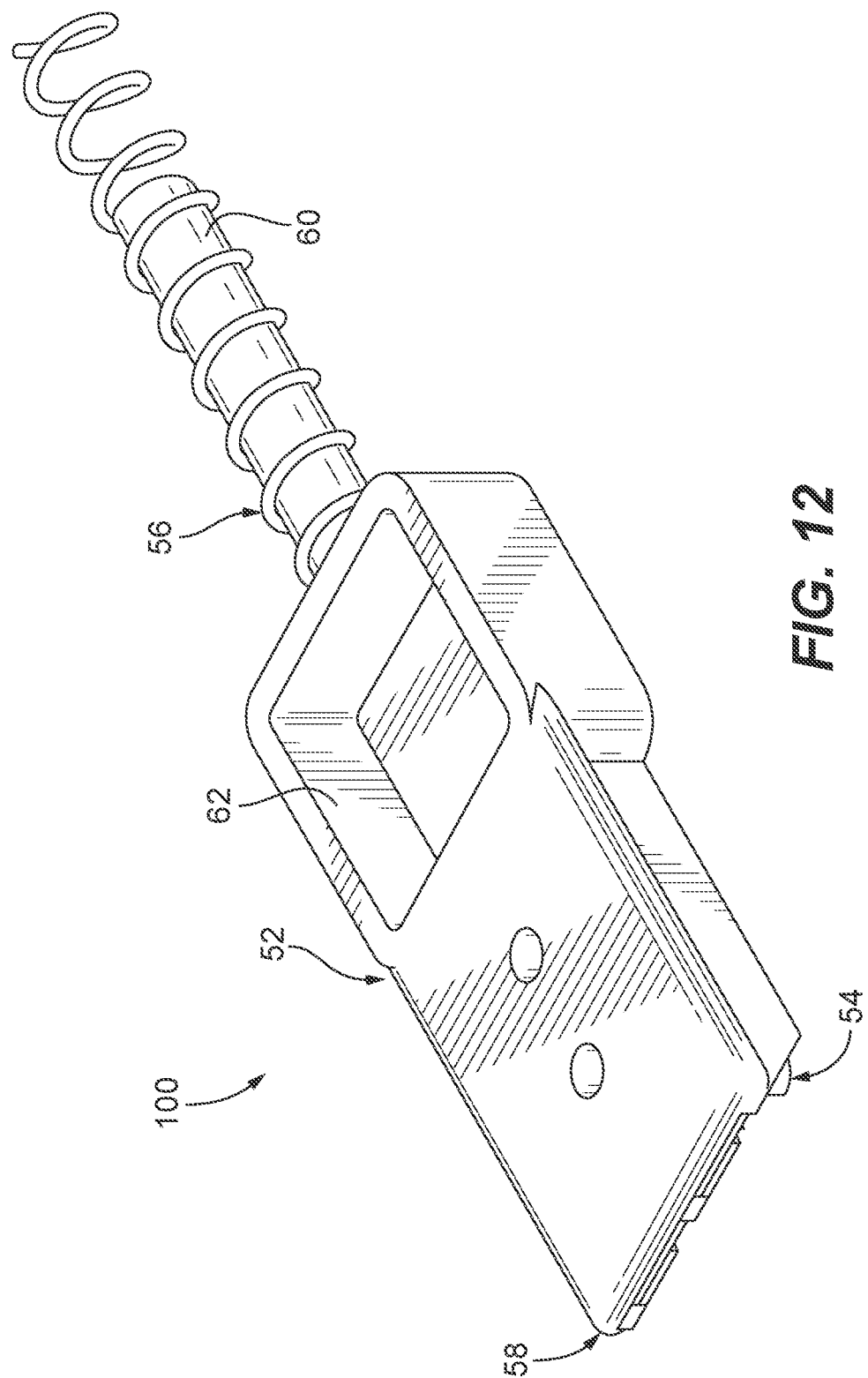
FIG. 12 is top perspective view of another exemplary embodiment of a latch assembly for the enclosure cover of FIG. 1.

Turning now to FIG. 12, another exemplary embodiment of the latch assembly according to the present disclosure, which may also be referred to herein as the "assembly," is shown. The latch assembly 100 is substantially similar to latch assembly 50 and includes the body 52, latch stop 54 and spring 56 described above such that the same numerals will be used for similar elements. A difference between latch assembly 50 and latch assembly 100 is the width of the body 52 and thus the dimensions of the cup 62. More specifically, the cup 62 has a square shape making the cup wider to receive the distal end 72 of the tool 70 when unlocking the latch assembly 100 and removing the enclosure cover 30. This wider cup permits the latch assembly 100 to be unlocked by rotational movement of the tool 70 instead of pivotal movement of the tool.

Figure 13:
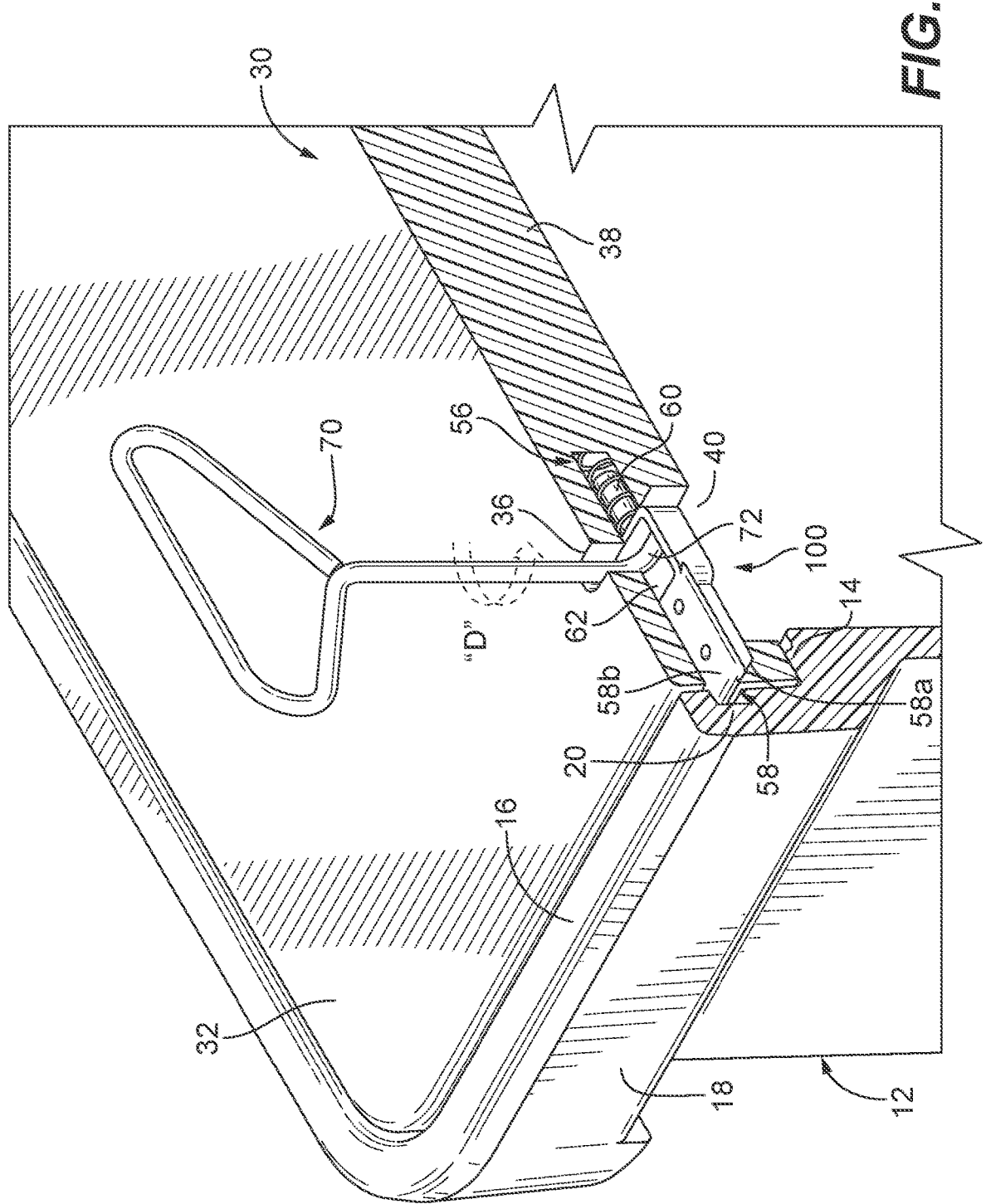
FIG. 13 is a top perspective view of a portion of an enclosure box and enclosure cover, illustrating a cover removal tool inserted through the enclosure cover and into a cup of the latch assembly of FIG. 12.

Referring to FIGS. 13 and 14, to remove the enclosure cover 30 having the latch assembly 100 from the enclosure box 12, a distal end 72 of the cover removal tool 70, which is angled, is inserted into the tool opening 36 in the enclosure cover 30 so that the distal end 72 of the tool 70 is at least partially within the cup 62 of the latch assembly 50 so that a side of the distal end 72 engages a side wall of the cup 62 as shown. The tool 70 is then rotated as shown by arrow "D" so that the distal end 72 pushes the latch assembly 50 inwardly toward the opening position compressing spring 56. The tool 70 is then lifted in the direction of arrow "E" so that the angled distal end 72 of the tool 70 engages an upper wall of the assembly opening 34, thus lifting the enclosure cover 30 out of the enclosure box 12.

While illustrative embodiments have been described and illustrated above, it should be understood that these are exemplary and are not to be considered as limiting. Additions, deletions, substitutions, and other modifications can be made without departing from the spirit or scope of the present disclosure. Accordingly, the invention is not to be considered as limited by the foregoing description.

What is claimed is:

1. A utility enclosure cover assembly comprising:
a cover dimensioned to rest on a cover receiving ledge of an enclosure box and having an upper surface, a lower surface, a side wall between the upper and lower surfaces, at least one assembly opening extending through the side wall and between the upper and lower surfaces toward an interior of the cover, and at least one tool opening extending from the upper surface to the at least one assembly opening allowing an end of a cover opening tool to be removably inserted by an end user; and
at least one latch assembly positioned within the at least one assembly opening and movable between a locking position and an opening position, wherein the at least one latch assembly is normally biased toward the locking position, and wherein the at least one latch assembly includes:
a body having a tongue at one end, a spring stem at another end and a cup positioned between the tongue and the spring stem, the cup having a plurality of side walls including a substantially vertical tool contacting wall, a substantially enclosed bottom wall and an open upper surface such that the plurality of side walls, bottom wall and open upper surface define an open container to receive the end of the cover opening tool, the cup being aligned directly below the at least one tool opening such that the cup is accessible from the upper surface of the cover by the cover opening tool as it is removably inserted by an end user through the at least one tool opening into the cup and engages the substantially vertical tool contacting wall;
a spring positioned on the spring stem that normally biases the latch assembly toward the locking position; and
a latch stop extending from the body that limits movement of the at least one latch assembly within the at least one assembly opening.

2. The utility enclosure cover assembly according to claim 1, wherein the at least one assembly opening is shaped to conform to the shape of the latch assembly.

3. The utility enclosure cover assembly according to claim 1, wherein the tongue has a camming surface that engages an edge of the enclosure box when the enclosure cover assembly is installed on the enclosure box causing the latch assembly to move toward the opening position compressing the spring.

4. The utility enclosure cover assembly according to claim 1, wherein the cup includes a drip opening to drain water and debris from the cup.

5. A utility enclosure comprising:
an enclosure box having a cover receiving ledge, and
an enclosure cover assembly used to cover the enclosure box, the enclosure cover assembly including:
a cover dimensioned to rest on the cover receiving ledge of the enclosure box, the cover having an upper surface, a lower surface, a side wall between the upper and lower surfaces, at least one assembly opening extending through the side wall and between the upper and lower surfaces toward an interior of the cover, and at least one tool opening extending from the upper surface of the cover to the at least one assembly opening allowing an end of a cover opening tool to be removably inserted by an end user;
at least one latch assembly positioned within the at least one assembly opening and movable between a locking position and an opening position, wherein the at least one latch assembly is normally biased toward the locking position, and wherein the at least one latch assembly includes:
a body having a tongue at one end, a spring stem at another end and a cup positioned between the tongue and the spring stem, the cup having a plurality of side walls including a substantially vertical tool contacting wall, a substantially enclosed bottom wall and an open upper surface such that the plurality of side walls, bottom wall and open upper surface define an open container to receive the end of the cover opening tool, the cup being aligned directly below the at least one tool opening such that the cup is accessible from the upper surface of the cover by the cover opening tool as it is removably inserted by an end user through the at least one tool opening into the cup and engages the substantially vertical tool contacting wall;
a spring positioned on the spring stem that normally biases the latch assembly toward the locking position; and
a latch stop extending from the body that limits movement of the at least one latch assembly within the at least one assembly opening.

6. The utility enclosure according to claim 5, wherein the tongue has a camming surface that engages an edge of the enclosure box when the enclosure cover assembly is installed on the enclosure box causing the latch assembly to move toward the opening position compressing the spring.

7. The utility enclosure according to claim 6, wherein a perimeter wall of the enclosure box adjacent the cover receiving ledge prevents the tongue of the latch assembly from returning to the locking position.

8. The utility enclosure according to claim 7, wherein when the tongue encounters a notch in the perimeter wall the spring causes the latch assembly to move to the locking position locking the cover to the enclosure box.

9. The utility enclosure according to claim 5, wherein the enclosure box is a direct burial enclosure.

10. The utility enclosure according to claim 5, wherein the cup includes a drip opening to drain water and debris from the cup.

11. The utility enclosure according to claim 5, further comprising a cover removal tool that can be inserted in the at least one tool opening to remove the cover from the enclosure box.

12. The utility enclosure according to claim 11, wherein when the cover removal tool is inserted into the at least one tool opening the tool can be pivoted or rotated to cause the latch assembly to move from the locking position to the open position.

13. The utility enclosure according to claim 11, wherein the cover removal tool has a free end and an angled distal end.

14. The utility enclosure according to claim 13, wherein when the free end of the cover removal tool is pivoted or rotated the angled distal end of the tool causes the latch assembly to move toward the opening position compressing the spring, and when the free end of the cover removal tool is lifted the angled distal end of the tool engages an upper wall of the assembly opening permitting the enclosure cover to be lifted out of the enclosure box.

15. A utility enclosure kit comprising:
an enclosure box having a cover receiving ledge; and
an enclosure cover assembly that can rest on the cover receiving ledge and is used to cover the enclosure box, the enclosure cover assembly including at least one latch assembly movable between a locking position and an opening position allowing the enclosure cover assembly to automatically lock when installed on the cover receiving ledge of the enclosure box, wherein the at least one latch assembly includes a body having a tongue at one end, a spring stem at another end, and a cup between the tongue and the spring stem, the cup having a plurality of side walls including a substantially vertical tool contacting wall, a substantially enclosed bottom wall and an open upper surface such that the plurality of side walls, bottom wall and open upper surface define an open container to receive an end of a cover opening tool, the cup being aligned directly below at least one tool opening such that the cup is accessible from the upper surface of the cover by the cover opening tool which engages the substantially vertical tool contacting wall; and
the cover opening tool having one end configured to be removably inserted into the open container by an end user and engage the substantially vertical tool contacting wall of the cup to unlock the enclosure cover assembly and configured to remove the enclosure cover assembly from the enclosure box.

16. The utility enclosure kit according to claim 15, wherein the enclosure cover assembly comprises:
a cover dimensioned to rest on the cover receiving ledge of the enclosure box, the cover having an upper surface, a lower surface, a side wall between the upper and lower surfaces, at least one assembly opening extending through the side wall and between the upper and lower surfaces toward an interior of the cover, and the at least one tool opening extending from the upper surface to the at least one assembly opening allowing the one end of the cover opening tool to be removably inserted by the end user;
the at least one latch assembly being positioned within the at least one assembly opening, and wherein the at least one latch assembly further includes:
a spring positioned on the spring stem that normally biases the latch assembly toward the locking position; and
a latch stop extending from the body that limits movement of the at least one latch assembly within the at least one assembly opening.

17. The utility enclosure kit according to claim 16, wherein the tongue has a camming surface that engages an edge of the enclosure box when the enclosure cover assembly is installed on the cover receiving ledge causing the latch assembly to move toward the opening position compressing the spring.

18. The utility enclosure kit according to claim 16, wherein a perimeter wall of the enclosure box adjacent the cover receiving ledge prevents the tongue of the latch assembly from returning to the locking position.

19. The utility enclosure kit according to claim 18, wherein when the tongue encounters a notch in the perimeter wall the spring causes the latch assembly to move to the locking position preventing the removal of the cover from the enclosure box.

20. The utility enclosure kit according to claim 16, wherein the cup includes a drip opening to drain water and debris from the cup.

21. The utility enclosure kit according to claim 16, wherein when the cover removal tool is inserted into the at least one tool opening the tool can be pivoted or rotated to cause the latch assembly to move from the locking position to the opening position.

22. The utility enclosure according to claim 15, wherein the cover removal tool has a free end and an angled distal end.

23. The utility enclosure kit according to claim 22, wherein when the free end of the cover opening tool is pivoted or rotated the angled distal end of the tool presses against the substantially vertical tool contacting wall and causes the latch assembly to move toward the opening position compressing the spring, and when the free end of the cover opening tool is lifted the angled distal end of the tool engages an upper wall of the assembly opening permitting the enclosure cover to be lifted out of the enclosure box.

24. The utility enclosure kit according to claim 15, wherein the enclosure box is a direct burial enclosure.

25. The utility enclosure cover assembly according to claim 1, wherein the at least one latch assembly is movable from the locking position to the opening position by inserting the cover opening tool through the at least one tool opening into the cup so that a distal end of the cover opening tool engages the substantially vertical tool contacting wall and by rotating the cover opening tool or pivoting the cover opening tool upwardly with respect to the cover.

26. The utility enclosure cover assembly according to claim 25, wherein the tool opening includes an upper wall and wherein the distal end of the cover opening tool is angled and engages the upper wall allowing the cover to be lifted and removed from the enclosure box.

\* \* \* \* \*